United States Patent [19]

Baldwin

[11] Patent Number: 4,851,837
[45] Date of Patent: Jul. 25, 1989

[54] METHOD AND APPARATUS FOR PROCESSING DIGITAL SIGNALS PRIOR TO RECORDING

[75] Inventor: John L. E. Baldwin, Chandlers End, United Kingdom

[73] Assignee: Independent Broadcasting Authority, London, United Kingdom

[21] Appl. No.: 865,725

[22] PCT Filed: Sep. 13, 1985

[86] PCT No.: PCT/GB85/00425
§ 371 Date: Jul. 2, 1986
§ 102(e) Date: Jul. 2, 1986

[87] PCT Pub. No.: WO86/01955
PCT Pub. Date: Mar. 27, 1986

[30] Foreign Application Priority Data
Sep. 13, 1984 [GB] United Kingdom ............... 8423165

[51] Int. Cl.$^4$ ............................................. H03M 7/00
[52] U.S. Cl. ...................................... 341/55; 341/50; 341/106; 360/40
[58] Field of Search .................. 340/347 DD; 375/19; 358/261; 360/39, 40; 235/310, 311; 341/50, 55, 59–61, 63, 106

[56] References Cited

U.S. PATENT DOCUMENTS

| | | | |
|---|---|---|---|
| 4,020,282 | 4/1977 | Halpern | 375/34 |
| 4,261,019 | 11/1979 | McClelland | 360/40 |
| 4,323,931 | 6/1980 | Jacoby | 360/40 |
| 4,387,364 | 6/1983 | Shirota | 360/39 X |
| 4,520,346 | 5/1985 | Shimada | 340/347 DD |

FOREIGN PATENT DOCUMENTS 0059224 9/1982 European Pat. Off. .
2094107 9/1982 United Kingdom .
2111805 10/1982 United Kingdom .

OTHER PUBLICATIONS

Journal of the Audio Engineering Society, vol. 31 (1983), Apr., No. 4.
IEEE Transactions on Magnetics, vol. MAG-13, No. 5, Sep. 1977–Jacoby.
IEEE Transactions on Magnetics, vol. MAG-18 (1982), Nov., No. 6, Cohn & Jacoby.
SMPTE Journal, vol. 92(1983), Sep., No. 9, Yoshida et al.
IBM Technical Disclosure Bulletin, vol. 14, No. 8, Jan. 1972—Judkovics et al.

Primary Examiner—William M. Shoop, Jr.
Assistant Examiner—Brian Young
Attorney, Agent, or Firm—Watson, Cole, Grindle & Watson

[57] ABSTRACT

A method of processing digital information prior to recording comprises converting input digital words into code words, each of the same period as the input digital word but containing a greater number of time slots than the number of bit locations in the digital word, providing a plurality of groups of code words and selecting the group from which a code word will be taken in any instance on the basis of the immediately preceding code word. The code words are defined such that there is a minimum spacing of three time slots between transitions and no transition is permitted in the last time slot. Two main groups of code words are provided which each have a transformed version. Apparatus for carrying out the method as described as is apparatus for decoding the encode words in replay.

8 Claims, 16 Drawing Sheets

FIG. 1

Basis of Code Book 'A' or '0'

```
        56701234567012 34           Number of
                                    Combinations
A       :::0:::::::00:::                  13
B       :::00::::00()0?:                   6
                              Total       19
```

FIG. 2

Basis of Code Book 'B' or '1'

```
        56701234567012 34           Number of
                                    Combinations
A0      :00I00:::::00:::                   9
A1      :000I00::::00:::                   6
B0      :00I00:::00()0?:                   4
B1      :000I00::00()0?:                   3
                              Total       22
```

FIG. 3

```
        Book 'A' or '0'                       Book 'B' or '1'
        0123456701                            0123456701
        :       :                             :       :
        00IIIIIII00                           00IIIIIII00
 1      ::::::::::          .   .   .   .   . I:::::::::
 2      ::I:::::::                            :I::::::::
 3      :::I::::::                            I::I::::::
 4      ::::I:::::          .   .   .   .   . :I::I:::::
 5      :::::I::::                            I:::I:::::
 6      ::::::I:::                            :I:::I::::
 7      :::::::I::          .   .   .   .   . I::::I::::
 8      ::I::I::::                            :I::::I:::
 9      ::I:::I:::                            I:::::I:::
10      ::I::::I::          .   .   .   .   . :I:::::I::
11      :::I::I:::                            I::::::I::
12      :::I:::I::                            I::I::::I::
13      ::::I::I::          .   .   .   .   . :I::I::::I::
14      :::::::::()                           I::I:::I::
15      ::I:::::()                            I:::I::I::
16      :::I::::()          .   .   .   .   . I:::::::()
17      ::::I:::()                            :I::::::()
18      :::::I::()                            I::I::::()
19      ::I::I::()          .   .   .   .   . :I::I:::()
20      ----------                            I:::I:::()
21      ----------                            :I:::I::()
22      ----------          .   .   .   .   . I::::I::()
        :       :                             :       :
        :       :                             :       :
```

FIG. 4

Basis of Code Book 'A' or '0'

```
        0123 etc.             0123 etc.             Number of
          :                     :                   Combinations
A     :::00:::::::::::::00:::           - - - - -       277
B     :::00:::::::::::::00()0?:         - - - - -       129
                                              Total     406
```

FIG. 5

Basis of Code Book 'B' or '1'

```
        0123 etc.             0123 etc
          :                     :                   Number of
                                                    Combinations
A0    :00I00:::::::::::::00:::           - - - - -      189
A1    :000I000:::::::::::00:::           - - - - -      129
B0    :00I00:::::::::::::00()0?:         - - - - -       88
B1    :000I00:::::::::::::00()0?:        - - - - -       60
                                              Total     466
```

| TRUTH TABLE 1 | | | TRUTH TABLE 2 TO 6 | | | | |
|---|---|---|---|---|---|---|---|
| LATCH OUTPUT | $D_0$ | $l'_0$ | $l'_1$ | $D_1$ (ODD) | $D_2$ (EVEN) | $l'_2$ ETC. | $l'_3$ | $l'_4$ |
| 0 | 0 | 0 | 0 | 0 | 0 | 0 | 0 | 0 |
| 0 | 1 | 0 | 0 | 0 | 1 | 1 | 0 | 0 |
| 1 | 0 | 1 | 0 | 1 | 0 | 0 | 1 | 0 |
| 1 | 1 | 0 | 1 | 1 | 1 | 0 | 0 | 1 |

FIG. 7

CODE BOOK - 'A' or '0'- cont

FIG. 10A

| No. | Direction wrt that at t=0- | |
|---|---|---|
| | Same | Opposite |
| 204 | 30.710150000 | 30.309120000 |
| 203 | 31.306130000 | 31.306130000 |
| 202 | 30.307140000 | 30.307140000 |
| 201 | 30.308150000 | 30.308150000 |
| 200 | 30.205130000 | 30.205130000 |
| 199 | 30.609150000 | 31.309120000 |
| 198 | 31.205130000 | 31.205130000 |
| 197 | 30.206140000 | 30.206140000 |
| 196 | 30.207150000 | 30.207150000 |
| 195 | 30.508150000 | 30.310130000 |
| 194 | 30.609120000 | 30.609120000 |
| 193 | 31.609120000 | 31.609120000 |
| 192 | 30.610130000 | 30.610130000 |
| 191 | 31.610130000 | 31.610130000 |
| 190 | 30.407150000 | 31.310130000 |
| 189 | 30.611140000 | 30.611140000 |
| 188 | 30.612150000 | 30.612150000 |
| 187 | 30.508120000 | 30.508120000 |
| 186 | 30.306150000 | 30.311140000 |
| 185 | 31.508120000 | 31.508120000 |
| 184 | 30.509130000 | 30.509130000 |
| 183 | 31.509130000 | 31.509130000 |
| 182 | 30.510140000 | 30.510140000 |
| 181 | 30.205150000 | 30.312150000 |
| 180 | 30.511150000 | 30.511150000 |
| 179 | 30.407120000 | 30.407120000 |
| 178 | 31.407120000 | 31.407120000 |
| 177 | 30.811140000 | 30.205090000 |
| 176 | 30.408130000 | 30.408130000 |
| 175 | 31.408130000 | 31.408130000 |
| 174 | 30.409140000 | 30.409140000 |
| 173 | 30.812150000 | 31.205090000 |
| 172 | 30.410150000 | 30.410150000 |
| 171 | 30.306120000 | 30.306120000 |
| 170 | 31.306120000 | 31.306120000 |
| 169 | 30.307130000 | 30.307130000 |
| 168 | 30.710140000 | 30.206100000 |
| 167 | 31.307130000 | 31.307130000 |
| 166 | 30.308140000 | 30.308140000 |
| 165 | 30.309150000 | 30.309150000 |
| 164 | 30.711150000 | 31.206100000 |
| 163 | 30.205120000 | 30.205120000 |
| 162 | 31.205120000 | 31.205120000 |
| 161 | 30.206130000 | 30.206130000 |
| 160 | 31.206130000 | 31.206130000 |
| 159 | 30.609140000 | 30.207110000 |
| 158 | 30.207140000 | 30.207140000 |
| 157 | 30.208150000 | 30.208150000 |
| 156 | 30.508110000 | 30.508110000 |
| 155 | 30.610150000 | 31.207110000 |
| 154 | 31.508110000 | 31.508110000 |

FIG. 10B

CODE BOOK - 'A' or '0'

| No. | Direction wrt that at t =0- | |
|---|---|---|
| | Same | Opposite |
| 255 | 11.700000000 | 11.500000000 |
| 254 | 11.800000000 | 11.600000000 |
| 253 | 20.610000000 | 20.210000000 |
| 252 | 21.610000000 | 21.210000000 |
| 251 | 20.711000000 | 20.311000000 |
| 250 | 20.209000000 | 20.209000000 |
| 249 | 21.711000000 | 21.311000000 |
| 248 | 20.812000000 | 20.412000000 |
| 247 | 21.209000000 | 21.209000000 |
| 246 | 21.812000000 | 21.412000000 |
| 245 | 21.207000000 | 20.513000000 |
| 244 | 21.308000000 | 21.513000000 |
| 243 | 20.310000000 | 20.310000000 |
| 242 | 20.409000000 | 20.614000000 |
| 241 | 21.409000000 | 20.715000000 |
| 240 | 21.310000000 | 21.310000000 |
| 239 | 20.510000000 | 20.211000000 |
| 238 | 21.510000000 | 21.211000000 |
| 237 | 20.611000000 | 20.312000000 |
| 236 | 20.411000000 | 20.411000000 |
| 235 | 21.611000000 | 21.312000000 |
| 234 | 20.712000000 | 20.413000000 |
| 233 | 21.411000000 | 21.411000000 |
| 232 | 21.712000000 | 21.413000000 |
| 231 | 20.813000000 | 20.514000000 |
| 230 | 21.813000000 | 20.615000000 |
| 229 | 20.512000000 | 20.512000000 |
| 228 | 21.208000000 | 20.212000000 |
| 227 | 20.309000000 | 21.212000000 |
| 226 | 21.512000000 | 21.512000000 |
| 225 | 21.309000000 | 20.313000000 |
| 224 | 20.410000000 | 21.313000000 |
| 223 | 21.410000000 | 20.414000000 |
| 222 | 20.613000000 | 20.613000000 |
| 221 | 20.511000000 | 20.515000000 |
| 220 | 21.511000000 | 20.213000000 |
| 219 | 21.613000000 | 21.613000000 |
| 218 | 20.612000000 | 21.213000000 |
| 217 | 21.612000000 | 20.314000000 |
| 216 | 20.713000000 | 20.415000000 |
| 215 | 20.714000000 | 20.714000000 |
| 214 | 21.713000000 | 20.214000000 |
| 213 | 20.814000000 | 20.315000000 |
| 212 | 20.815000000 | 20.815000000 |
| 211 | 30.510150000 | 30.510150000 |
| 210 | 30.407130000 | 30.407130000 |
| 209 | 31.407130000 | 31.407130000 |
| 208 | 30.811150000 | 31.308110000 |
| 207 | 30.408140000 | 30.408140000 |
| 206 | 30.409150000 | 30.409150000 |
| 205 | 30.306130000 | 30.306130000 |

FIG. 10C

CODE BOOK - 'A' or '0' - cont

| No. | Direction wrt that at t=0- | |
|---|---|---|
| | Same | Opposite |
| 153 | 30.509120000 | 30.509120000 |
| 152 | 31.509120000 | 31.309120000 |
| 151 | 30.510130000 | 30.510130000 |
| 150 | 30.508140000 | 30.208120000 |
| 149 | 31.510130000 | 31.510130000 |
| 148 | 30.511140000 | 30.511140000 |
| 147 | 30.512150000 | 30.512150000 |
| 146 | 30.509150000 | 31.208120000 |
| 145 | 30.407110000 | 30.407110000 |
| 144 | 31.407110000 | 31.407110000 |
| 143 | 30.408120000 | 30.408120000 |
| 142 | 30.407140000 | 30.209130000 |
| 141 | 31.408120000 | 31.408120000 |
| 140 | 30.409130000 | 30.409130000 |
| 139 | 31.409130000 | 31.409130000 |
| 138 | 30.410140000 | 30.410140000 |
| 137 | 30.408150000 | 31.209130000 |
| 136 | 30.411150000 | 30.411150000 |
| 135 | 30.306110000 | 30.306110000 |
| 134 | 31.306110000 | 31.306110000 |
| 133 | 30.306140000 | 30.210140000 |
| 132 | 30.307120000 | 30.307120000 |
| 131 | 31.307120000 | 31.307120000 |
| 130 | 30.308130000 | 30.308130000 |
| 129 | 31.308130000 | 31.308130000 |
| 128 | 30.307150000 | 30.211150000 |
| 127 | 30.309140000 | 30.309140000 |
| 126 | 30.310150000 | 30.310150000 |
| 125 | 30.205110000 | 30.205110000 |
| 124 | 30.205140000 | 31.205080000 |
| 123 | 31.205110000 | 31.205110000 |
| 122 | 30.206120000 | 30.206120000 |
| 121 | 31.206120000 | 31.206120000 |
| 120 | 30.207130000 | 30.207130000 |
| 119 | 30.206150000 | 30.206090000 |
| 118 | 31.207130000 | 31.207130000 |
| 117 | 30.208140000 | 30.208140000 |
| 116 | 30.209150000 | 30.209150000 |
| 115 | 30.710130000 | 31.206090000 |
| 114 | 30.407100000 | 30.407100000 |
| 113 | 31.407100000 | 31.407100000 |
| 112 | 30.408110000 | 30.408110000 |
| 111 | 31.408110000 | 31.408110000 |
| 110 | 31.710130000 | 30.207100000 |
| 109 | 30.409120000 | 30.409120000 |
| 108 | 31.409120000 | 31.309120000 |
| 107 | 30.410130000 | 30.410130000 |
| 106 | 30.711140000 | 31.207100000 |
| 105 | 31.410130000 | 31.410130000 |
| 104 | 30.411140000 | 30.411140000 |
| 103 | 30.412150000 | 30.412150000 |
| 102 | 30.712150000 | 30.208110000 |

FIG. 10D

CODE BOOK - 'A' or '0' - cont

| No. | Direction wrt that at t=0- | |
|---|---|---|
| | Same | Opposite |
| 101 | 30.306100000 | 30.306100000 |
| 100 | 31.306100000 | 31.306100000 |
| 99 | 30.307110000 | 30.307110000 |
| 98 | 31.307110000 | 31.307110000 |
| 97 | 30.609130000 | 31.208110000 |
| 96 | 30.308120000 | 30.308120000 |
| 95 | 31.308120000 | 31.308120000 |
| 94 | 30.309130000 | 30.309130000 |
| 93 | 31.609130000 | 30.209120000 |
| 92 | 31.309130000 | 31.309130000 |
| 91 | 30.310140000 | 30.310140000 |
| 90 | 30.311150000 | 30.311150000 |
| 89 | 30.205100000 | 30.205100000 |
| 88 | 30.610140000 | 31.209120000 |
| 87 | 31.205100000 | 31.205100000 |
| 86 | 30.206110000 | 30.206110000 |
| 85 | 31.206110000 | 31.206110000 |
| 84 | 30.611150000 | 30.210130000 |
| 83 | 30.207120000 | 30.207120000 |
| 82 | 31.207120000 | 31.207120000 |
| 81 | 30.208130000 | 30.208130000 |
| 80 | 31.208130000 | 31.208130000 |
| 79 | 30.508130000 | 31.210130000 |
| 78 | 30.209140000 | 30.209140000 |
| 77 | 30.210150000 | 30.210150000 |
| 76 | 30.306090000 | 30.306090000 |
| 75 | 31.508130000 | 30.211140000 |
| 74 | 31.306090000 | 31.306090000 |
| 73 | 30.307100000 | 30.307100000 |
| 72 | 31.307100000 | 31.307100000 |
| 71 | 30.509140000 | 30.212150000 |
| 70 | 30.308110000 | 30.308110000 |
| 69 | 40.509121500 | 40.509121500 |
| 68 | 40.408121500 | 40.408121500 |
| 67 | 40.609121500 | 40.306091400 |
| 66 | 40.307121500 | 40.307121500 |
| 65 | 40.206121500 | 40.206121500 |
| 64 | 40.508121500 | 40.205091400 |
| 63 | 40.408111400 | 40.408111400 |
| 62 | 40.307111400 | 40.207111400 |
| 61 | 40.407121500 | 40.205081300 |
| 60 | 40.206111400 | 40.206111400 |
| 59 | 40.207101300 | 40.307101300 |
| 58 | 40.306121500 | 41.205081300 |
| 57 | 41.307101300 | 41.307101300 |
| 56 | 40.206101300 | 40.206101300 |
| 55 | 40.205121500 | 40.309121500 |
| 54 | 41.206101300 | 41.206101300 |
| 53 | 40.206091200 | 40.206091200 |
| 52 | 40.508111400 | 40.208121500 |

FIG. 10E

CODE BOOK - 'A' or '0' - cont

| No. | Direction wrt that at t=0- | |
|---|---|---|
| | Same | Opposite |
| 51 | 41.206091200 | 41.206091200 |
| 50 | 40.508111500 | 40.508111500 |
| 49 | 40.407111400 | 40.208111400 |
| 48 | 40.407111500 | 40.407111500 |
| 47 | 40.306111500 | 40.306111500 |
| 46 | 40.306111400 | 40.308111500 |
| 45 | 40.205111500 | 40.205111500 |
| 44 | 40.407101400 | 40.407101400 |
| 43 | 40.205111400 | 40.207111500 |
| 42 | 40.306101400 | 40.306101400 |
| 41 | 40.205101400 | 40.205101400 |
| 40 | 40.407101300 | 40.207101400 |
| 39 | 40.306091300 | 40.306091300 |
| 38 | 41.306091300 | 41.306091300 |
| 37 | 41.407101300 | 40.307101500 |
| 36 | 40.205091300 | 40.205091300 |
| 35 | 41.205091300 | 41.205091300 |
| 34 | 40.306101300 | 40.206101500 |
| 33 | 30.205081200 | 40.205081200 |
| 32 | 41.205081200 | 41.205091200 |
| 31 | 41.305101300 | 40.206091400 |
| 30 | 40.409121500 | 40.409121500 |
| 29 | 40.308121500 | 40.308121500 |
| 28 | 40.205101300 | 40.206091500 |
| 27 | 40.207121500 | 40.207121500 |
| 26 | 40.308111400 | 40.308111400 |
| 25 | 41.205101300 | 40.205091500 |
| 24 | 40.207111400 | 40.207111400 |
| 23 | 40.207101300 | 40.207101300 |
| 22 | 40.306091200 | 40.205081400 |
| 21 | 41.207101300 | 41.207101300 |
| 20 | 40.408111500 | 40.408111500 |
| 19 | 41.306091200 | 40.209121500 |
| 18 | 40.307111500 | 40.307111500 |
| 17 | 40.206111500 | 40.206111500 |
| 16 | 40.205091200 | 40.208111500 |
| 15 | 40.307101400 | 40.307101400 |
| 14 | 40.206101400 | 40.206101400 |
| 13 | 41.205091200 | 40.207101500 |
| 12 | 40.206091300 | 40.206091300 |
| 11 | 41.206091300 | 41.206091300 |
| 10 | 40.205081100 | 40.206091500 |
| 9 | 40.407101500 | 40.407101500 |
| 8 | 40.306101500 | 40.306101500 |
| 7 | 41.205081100 | 40.205081500 |
| 6 | 40.205101500 | 40.205101500 |
| 5 | 50.205081114 | 50.205081114 |
| 4 | 50.205081215 | 50.205081215 |
| 3 | 50.206091215 | 50.206091215 |
| 2 | 50.205081115 | 50.205081115 |
| 1 | 50.205091215 | 50.205091215 |
| 0 | 50.306091215 | 50.306091215 |

FIG. 10F

CODE BOOK - 'B' or '1'

| No. | Direction wrt that at t=0- | |
|---|---|---|
| | Same | Opposite |
| 255 | 20.009000000 | 20.009000000 |
| 254 | 21.105000000 | 20.010000000 |
| 253 | 21.005000000 | 21.010000000 |
| 252 | 21.009000000 | 21.009000000 |
| 251 | 21.106000000 | 20.111000000 |
| 250 | 21.006000000 | 21.111000000 |
| 249 | 21.107000000 | 20.011000000 |
| 248 | 20.110000000 | 20.110000000 |
| 247 | 21.007000000 | 21.011000000 |
| 246 | 21.108000000 | 20.112000000 |
| 245 | 21.110000000 | 21.110000000 |
| 244 | 21.008000000 | 21.112000000 |
| 243 | 20.109000000 | 20.012000000 |
| 242 | 21.109000000 | 21.012000000 |
| 241 | 30.104100000 | 30.104100000 |
| 240 | 30.104150000 | 30.104090000 |
| 239 | 30.003150000 | 31.104090000 |
| 238 | 31.104100000 | 31.104100000 |
| 237 | 30.104140000 | 30.105100000 |
| 236 | 30.105150000 | 31.105100000 |
| 235 | 30.105110000 | 30.105110000 |
| 234 | 30.003140000 | 30.106110000 |
| 233 | 30.004150000 | 31.106110000 |
| 232 | 31.105110000 | 31.105110000 |
| 231 | 30.104130000 | 30.107120000 |
| 230 | 31.104130000 | 31.107120000 |
| 229 | 30.106120000 | 30.106120000 |
| 228 | 30.105140000 | 30.108130000 |
| 227 | 30.106150000 | 31.108130000 |
| 226 | 31.106120000 | 31.106120000 |
| 225 | 30.003130000 | 30.109140000 |
| 224 | 31.003130000 | 30.110150000 |
| 223 | 30.107130000 | 30.107130000 |
| 222 | 30.004140000 | 30.003090000 |
| 221 | 30.005150000 | 31.003090000 |
| 220 | 31.107130000 | 31.107130000 |
| 219 | 30.104120000 | 30.004100000 |
| 218 | 31.104120000 | 31.004100000 |
| 217 | 30.108140000 | 30.108140000 |
| 216 | 30.105130000 | 30.005110000 |
| 215 | 31.105130000 | 31.005110000 |
| 214 | 30.109150000 | 30.109150000 |
| 213 | 30.106140000 | 30.006120000 |
| 212 | 30.107150000 | 31.006120000 |
| 211 | 30.003120000 | 30.007130000 |
| 210 | 30.003100000 | 30.003100000 |
| 209 | 31.003120000 | 31.007130000 |
| 208 | 30.004130000 | 30.008140000 |
| 207 | 31.003100000 | 31.003100000 |
| 206 | 31.004130000 | 30.009150000 |
| 205 | 30.005140000 | 31.104080000 |

FIG. 10G

CODE BOOK - 'B' or '1' -contd

| No. | Direction wrt that at t=0- | |
|---|---|---|
| | Same | Opposite |
| 204 | 30.004110000 | 30.004110000 |
| 203 | 30.006150000 | 30.105090000 |
| 202 | 30.104110000 | 31.105090000 |
| 201 | 31.004110000 | 31.004110000 |
| 200 | 31.104110000 | 30.106100000 |
| 199 | 30.105120000 | 31.106100000 |
| 198 | 30.005120000 | 30.005120000 |
| 197 | 31.105120000 | 30.107110000 |
| 196 | 30.106130000 | 31.107110000 |
| 195 | 31.005120000 | 31.005120000 |
| 194 | 31.106130000 | 30.108120000 |
| 193 | 30.107140000 | 31.108120000 |
| 192 | 30.006130000 | 30.006130000 |
| 191 | 30.108150000 | 30.109130000 |
| 190 | 30.003110000 | 31.109130000 |
| 189 | 31.006130000 | 31.006130000 |
| 188 | 31.003110000 | 30.110140000 |
| 187 | 30.004120000 | 30.111150000 |
| 186 | 30.007140000 | 30.007140000 |
| 185 | 31.004120000 | 31.003080000 |
| 184 | 30.005130000 | 30.004090000 |
| 183 | 30.008150000 | 30.008150000 |
| 182 | 31.005130000 | 31.004090000 |
| 181 | 30.006140000 | 30.005100000 |
| 180 | 30.007150000 | 31.005100000 |
| 179 | 40.106121500 | 40.106121500 |
| 178 | 40.005121500 | 40.005121500 |
| 177 | 40.104121500 | 41.003071300 |
| 176 | 40.106111400 | 40.106111400 |
| 175 | 40.003121500 | 40.003061200 |
| 174 | 40.005111400 | 40.005111400 |
| 173 | 40.106101300 | 40.106101300 |
| 172 | 40.104111400 | 41.003061200 |
| 171 | 41.106101300 | 41.106101300 |
| 170 | 40.003111400 | 40.108121500 |
| 169 | 40.005101300 | 40.005101300 |
| 168 | 40.104101300 | 40.007121500 |
| 167 | 41.005101300 | 41.005101300 |
| 166 | 40.106091200 | 40.106091200 |
| 165 | 41.104101300 | 40.108111400 |
| 164 | 41.106091200 | 41.106091200 |
| 163 | 40.003101300 | 40.007111400 |
| 162 | 40.005091200 | 40.005091200 |
| 161 | 41.003101300 | 40.007101300 |
| 160 | 41.005091200 | 41.005091200 |
| 159 | 40.005081100 | 40.005081100 |
| 158 | 40.104091200 | 41.007101300 |
| 157 | 41.005081100 | 41.005081100 |
| 156 | 41.104091200 | 40.107111500 |
| 155 | 40.105111500 | 40.105111500 |
| 154 | 40.003091200 | 40.006111500 |

FIG. 10H

CODE BOOK - 'B' or '1' - contd

| No. | Direction wrt that at t=0- | |
|---|---|---|
| | Same | Opposite |
| 153 | 40.004111500 | 40.004111500 |
| 152 | 40.105101400 | 40.105101400 |
| 151 | 41.003091200 | 40.107101400 |
| 150 | 40.004101400 | 40.004101400 |
| 149 | 40.104081100 | 40.006101400 |
| 148 | 40.105091300 | 40.105091300 |
| 147 | 41.105091300 | 41.105091300 |
| 146 | 41.104081100 | 40.006091300 |
| 145 | 40.004091300 | 40.004091300 |
| 144 | 40.003081100 | 41.006091300 |
| 143 | 41.004091300 | 41.004091300 |
| 142 | 41.003081100 | 40.106101500 |
| 141 | 40.105081200 | 40.105081200 |
| 140 | 41.105081200 | 41.105081200 |
| 139 | 40.104071000 | 40.005101500 |
| 138 | 40.004081200 | 40.004081200 |
| 137 | 41.104071000 | 40.106091400 |
| 136 | 41.004081200 | 41.004081200 |
| 135 | 40.003071000 | 40.005091400 |
| 134 | 40.004071100 | 40.004071100 |
| 133 | 41.004071100 | 41.004071100 |
| 132 | 41.003071000 | 40.005081300 |
| 131 | 40.104101500 | 40.104101500 |
| 130 | 40.003060900 | 41.005081300 |
| 129 | 40.003101500 | 40.003101500 |
| 128 | 41.003060900 | 40.105091500 |
| 127 | 40.104091400 | 40.104091400 |
| 126 | 40.003091400 | 40.003091400 |
| 125 | 40.105121500 | 40.004091500 |
| 124 | 40.104081300 | 40.104081300 |
| 123 | 40.004121500 | 40.105081400 |
| 122 | 41.104081300 | 41.104081300 |
| 121 | 40.003081300 | 40.003081300 |
| 120 | 40.105111400 | 40.004081400 |
| 119 | 41.003081300 | 41.003081300 |
| 118 | 40.004111400 | 40.004071300 |
| 117 | 40.104071200 | 40.104071200 |
| 116 | 40.105101300 | 41.004071300 |
| 115 | 41.104071200 | 41.104071200 |
| 114 | 40.003071200 | 40.003071200 |
| 113 | 41.105101300 | 40.104081500 |
| 112 | 41.003071200 | 41.003071200 |
| 111 | 40.004101300 | 40.003081500 |
| 110 | 40.003061100 | 40.003061100 |
| 109 | 41.004101300 | 40.104071400 |
| 108 | 41.003061100 | 41.003061100 |
| 107 | 40.107121500 | 40.107121500 |
| 106 | 40.105091200 | 40.003071400 |
| 105 | 40.006121500 | 40.006121500 |
| 104 | 41.105091200 | 40.003061300 |
| 103 | 40.107111400 | 40.107111400 |

FIG. 101

```
           CODE BOOK - 'B' or '1' - contd
      No.     Direction wrt that at t=0-
              Same           Opposite
      102    40.004091200    41.003061300
      101    40.006111400    40.006111400
      100    40.107101300    40.107101300
       99    41.004091200    40.109121500
       98    41.107101300    41.107101300
       97    40.105081100    40.008121500
       96    40.006101300    40.006101300
       95    41.006101300    41.006101300
       94    41.105081100    40.008111400
       93    40.006091200    40.006091200
       92    40.004081100    40.108111500
       91    41.006091200    41.006091200
       90    41.004081100    40.007111500
       89    40.106111500    40.106111500
       88    40.005111500    40.005111500
       87    40.004071000    40.007101400
       86    40.106101400    40.106101400
       85    41.004071000    40.107101500
       84    40.005101400    40.005101400
       83    40.104111500    40.006101500
       82    40.106091300    40.106091300
       81    41.106091300    41.106091300
       80    40.003111500    40.006091400
       79    40.005091300    40.005091300
       78    40.104101400    40.106091500
       77    41.005091300    41.005091300
       76    40.003101400    40.005091500
       75    40.005081200    40.005081200
       74    41.005081200    41.005081200
       73    40.104091300    40.005081400
       72    40.105101500    40.105101500
       71    41.104091300    40.105081500
       70    40.004101500    40.004101500
       69    40.105091400    40.105091400
       68    40.003091300    40.004081500
       67    40.004091400    40.004091400
       66    41.003091300    40.004071400
       65    40.105081300    40.105081300
       64    40.104081200    40.104071500
       63    41.105081300    41.105081300
       62    40.004081300    40.004081300
       61    41.104081200    40.003071500
       60    41.004081300    41.004081300
       59    40.003081200    40.003061400
       58    40.004071200    40.004071200
       57    41.003081200    40.009121500
       56    41.004071200    41.004071200
       55    40.104091500    40.104091500
       54    40.104071100    40.008111500
       53    40.003091500    40.003091500
       52    41.104071100    40.007101500
```

FIG. 10J

```
         CODE BOOK - 'B' or '1' - contd
  No.     Direction wrt that at t=0-
          Same              Opposite
   51     40.104081400      40.104081400
   50     40.003071100      40.006091500
   49     40.003081400      40.003081400
   48     40.104071300      40.104071300
   47     41.003071100      40.005081500
   46     41.104071300      41.104071300
   45     40.003061000      40.004071500
   44     40.003071300      40.003071300
   43     41.003061000      40.003061500
   42     50.003071014      50.003071014
   41     50.104071014      50.104071014
   40     50.004081115      50.004081115
   39     50.003091215      50.003060912
   38     50.105081115      50.105081115
   37     50.003071115      50.003071115
   36     50.104091215      51.003060912
   35     50.104071115      50.104071115
   34     50.003060914      50.003060914
   33     50.003081115      50.004071013
   32     50.004071015      50.004071015
   31     50.003061015      50.003061015
   30     50.003071013      50.003071013
   29     50.104081115      51.004071013
   28     51.003071013      51.003071013
   27     50.104071013      50.104071013
   26     50.003071015      50.003061013
   25     51.104071013      51.104071013
   24     50.004081114      50.004081114
   23     50.104071015      51.003061013
   22     50.105081114      50.105081114
   21     50.003071114      50.003071114
   20     50.104071114      50.104071114
   19     50.003060915      50.005081114
   18     50.005091215      50.005091215
   17     50.106091215      50.106091215
   16     50.003081114      50.004071114
   15     50.004081215      50.004081215
   14     50.105081215      50.105081215
   13     50.104081114      50.003061114
   12     50.003071215      50.003071215
   11     50.104071215      50.104071215
   10     50.003060913      50.003060913
    9     50.004091215      50.006091215
    8     51.003060913      51.003060913
    7     50.004071014      50.004071014
    6     50.105091215      50.005081215
    5     50.003061014      50.003061014
    4     50.005081115      50.005081115
    3     50.003081215      50.004071215
    2     50.004071115      50.004071115
    1     50.003061115      50.003061115
    0     50.104081215      50.003061215
```

METHOD AND APPARATUS FOR PROCESSING DIGITAL SIGNALS PRIOR TO RECORDING

BACKGROUND OF THE INVENTION

Field of the Invention

The present invention relates to a method and apparatus for processing digital signals prior to recording. More particularly but not exclusively the digital signals represent television video signals.

A channel code which had a minimum separation of 1½ bit cells and which also was capable of statistically controlling the low frequency components was described in our co-pending U.K. Application No. A-2,141,906. For each successive group of eight bits it is possible, theoretically, (at least on average) to identify just over 453 discrete combinations and this should make it possible to construct a blockcode with controlled low frequencies with a minimum transition separation of 1½ bit cells.

An alternative proposal has been made which operates on a bit-by-bit basis. Consideration has been given to the realisation of this alternative proposal but there are a number of difficulties which stem from the combination of the necessary high speed, the look ahead and the modulo-three requirements of parts of the coder.

SUMMARY OF THE INVENTION

The present invention provides a method for processing digital information for recording comprising the steps of inputting a succession of input digital words each comprising a plurality of bit locations, generating a respective code word for each digital word with each code word being of the same duration as a digital word but having a number of time slots greater than the number of bit locations in an input word providing a plurality of groups of code words, and selecting for each digital word a code word from one of the plurality of groups on the basis of the immediately preceding code word used.

Preferably, in each code word there is a period of three time slots between adjacent transitions. It is also advantageous to use more than two groups of code words e.g. two main groups may be used with each main group having a transformed or "opposite" group.

An advantage of the method is that less read only memory is required whilst approaching close to the theoretical limit of just over 453 different combinations in each block of 8 cells.

BRIEF DESCRIPTION OF THE DRAWINGS

In order that the present invention be more readily understood an embodiment thereof described by way of example with reference to the accompanying drawings, in which:

FIG. 1 shows the basis of a first code book for 4-bit words;

FIG. 2 shows the basis of a second code book for 4-bit words;

FIG. 3 shows the time of transitions for certain combinations in the first and second code books;

FIG. 4 shows the basis of a first code book for 8-bit words;

FIG. 5 shows the basis of a second code book for 8-bit words;

FIG. 7 shows truth tables to assist understanding of the encoder shown in FIG. 6;

FIGS. 10A–10J are a print out of the complete first and second code books.

DETAILED DESCRIPTION

Figure 6:
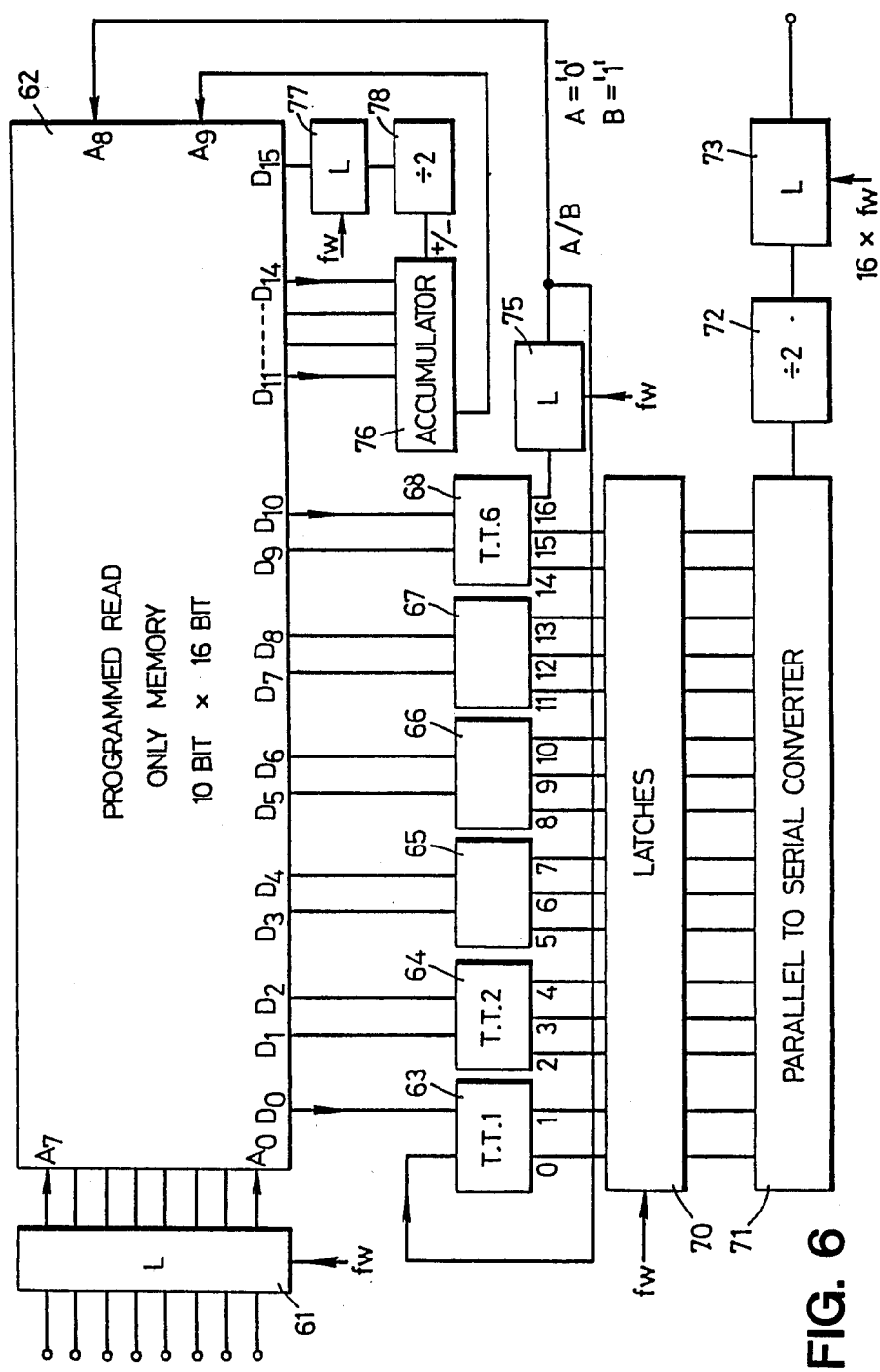
FIG. 6 shows in block diagram form an encoder which utilizes the first and second code books for 8-bit words.

Before describing the invention in detail, it is considered helpful to explain some basic principles of the coding system being used. It is to be remembered that the techniques disclosed in our co-pending application identified above are still being used and attention is directed to that case for further details. Suffice to say that the present invention comprises a method of processing digital information for recording purposes. The processing is organised on a word-based arrangement and generates a code word for each input digital word to be recorded, the code word occupies the same time as the input digital word but has at least double the number of time slots with respect to the number of bit locations in an input digital word. In a code word, transitions are not permitted at specified locations.

For a minimum transition separation of three half cells, the number of different combinations which can be portrayed as the number of half-cells increases from 0 to 34 is shown in the following table:

TABLE 1

| | | | | | |
|---|---|---|---|---|---|
| 0..1 | 6..13 | 12..129 | 18..1278 | 24..12664 | 30..125491 |
| 1..2 | 7..19 | 13..189 | 19..1873 | 25..18560 | 31..183916 |
| 2..3 | 8..28 | 14..277 | 20..2745 | 26..27201 | 32..269542 |
| 3..4 | 9..41 | 15..406 | 21..4023 | 27..39865 | 33..395033 |
| 4..6 | 10..60 | 16..595 | 22..5896 | 28..58425 | 34..578949 |
| 5..9 | 11..88 | 17..872 | 23..8641 | 29..85626 | etc. |

A way of preventing transitions from being less than three half-cells spacing between blocks would be to arrange that there were two half-cells without transitions between the end of one block and the start of the next. An eight bit data block, allowing for the two half-cells between blocks, would leave 14 half-cells for information which can provide 277 combinations. This is significantly less than the 453 combinations theoretically available on average, amounting to only 61%. If a 16 bit data block could be realised, providing 30 information slots and 125491 combinations, this would provide a number of combinations equivalent to 354 per eight bit data block. This is better but it is still far short of the 453 combinations theoretically available.

A much better coding strategy has been discovered and to illustrate the principle this will be described for a four bit-data block. This coding strategy uses two alternative Code Books 'A' and 'B' and the basis for each of these is shown in FIGS. 1 and 2 respectively.

In Code Book 'A' there is a first range (A) in which transitions are barred in time slots 0 and 1 in the word being coded and also in the subsequent word. A 'O' in a time slot indicates that a transition is not permitted, a ':' indicates that a transition is permissible providing no two transitions are closer than three half-cells. There are 13 combinations of patterns and for this first range (A) the subsequent word will also be coded on the basis of Book 'A'. The second range 'B' has word transitions barred in time slots 0,1,6,7 and there must be a transition in time slots 0 or 1 of the following word i.e. within the brackets. Note however that the choice of the two positions will be determined by the next 4-bit word. This second range (B) provides a further 6 combinations making 19 in all available for Code Book 'A'. When the range 'B' is used for one word the next word must be coded on the basis of Code Book 'B' shown in FIG. 2.

Again there are two basic ranges 'A' and 'B' but in this case each is split into two giving sub-ranges A0, A1, B0 and B1. For A0 and B0 there is a defined transition at time slot 0 whereas for A1 and B1 it is at time slot 1. A0 and A1 give 9 and 6 combinations respectively and for these 15 cases the following word is coded on the basis of Code Book 'A'. B0 and B1 give 4 and 3 combinations and for these 7 cases the following word is coded on the basis of Code Book 'B'. The total number of combinations is therefore 22 for Code Book 'B'.

For random data, Code Book (A) would be used on about 68% of occasions, Code Book (B) for the remainder, so the average number of combinations for every 4 bit-cells would be just under 20 or approximately 400 combinations in eight bit-cells - an efficiency of about 88% of the theoretical limit.

FIG. 3 shows the time of transitions for the 19 and 22 possible combinations in Code Books 'A' and 'B' respectively.

Since the number of available combinations exceeds the sixteen necessary to carry 4 bits of binary information it is possible to eliminate patterns having less desirable characteristics, for example the one having no transitions, and/or to allocate two different patterns to certain 4 bit combinations. This may be most usefully realised by replacing Code Book 'A' by two alternatives Code Book 'A' 'same' and Code Book 'A' 'opposite'. For at least 13 of the 16 binary combinations the patterns stored in the alternative code books would be the same but for three combinations the patterns in the 'same' and 'opposite' sections could differ. For these combinations the patterns would be chosen on the basis that the direct component due to the pattern would be in the 'same' or the 'opposite' direction to the polarity existing immediately before some sensible reference time for example just prior to time slot '0'.

If a '1' be stored to indicate a transition and a '0' to indicate no transition then the parallel information from the Read Only Memory when serialised could cause a change of state of a divide by two counter to generate the signal to be recorded.

The same type of splitting of Code Book 'B' into sections 'same' and 'opposite' would be used but in this case at least 10 patterns would appear unchanged in both sections whilst 6 patterns could differ.

If an odd number of transitions occurs in a word then the polarity at the reference time for the next word is reversed.

A total of six address bits for the ROM would be required and these consist of 4 for the binary date, one to select between Code Books 'A' and 'B' and one to select between 'same' and 'opposite'.

It might appear at first sight that nine output bits are required, eight to indicate the presence or absence of a transition in each of the 8 time slots and one to instruct the ROM which of the Code Books 'A' and 'B' to use for the next 4-bit word.

By means of three 2-input gates, two binary digits giving four states can be very easily used to produce the four possible patterns that can occur by three consecutive time slots; these possible patterns consist of no transition or a transition in the first, second or third time slot. It is also possible to use 5 bits to control transitions in 8 time slots. Transitions in time slots 0 and 1 can only occur when Code Book 'B' is in use and must occur in one of these positions so a simple ROM output bit may be used to control which of these two time slots must contain the transition.

If there is spare output capacity in the ROM it would be worth considering that one bit should be used to indicate if a word results in an odd or an even number of transitions since this is required information for the control of the direct component. Spare output capacity could also be used to give a measure of the direct component being produced by each word but the sign of this must also take note of the polarity of the signal at the reference time.

Since there are many alternatives for the ROM system, which can even include direct generation of the signal to be recorded by the ROM (but probably in parallel form) it seems pointless giving ROM details and that transition patterns are all that is necessary to define the channel code.

So far the information has been on a 4-bit coder, obviously other sizes are possible and the one of particular interest is a coder for 8-bits. For such a coder FIGS. 4 and 5 show the basis of Code Books 'A' and 'B' which yield 406 and 466 combinations respectively. The average of these when weighted for frequency of occurrence is about 425 or about 94% of that theoretically achievable.

The reason that a higher efficiency is not achieved stems from the occasions when transitions in the 14 time slot are barred even when the next transition is in time 1 of the next word.

To save space in providing information for the look-up table and to make computation easier, the number of transitions in time slots 0-15 inclusive, the Code Book to use for the next word, and the time slots in which transitions occur, are combined in one 11 digit word. First digit (in the tens position) gives the number of transitions in time slots 0-15 inclusive. The second digit (units position) gives which Code Book is to be used for the following word O corresponds to A, 1 to B.

After the decimal point the first digit gives the address of the first transition, this never exceeds 8. The next pair and subsequent pairs of digits give addresses of the subsequent transitions but note that pairs 00 do not signify a transition. For example in Code Book 'B' or '1' level 16 'same' the number is 50.003081114.

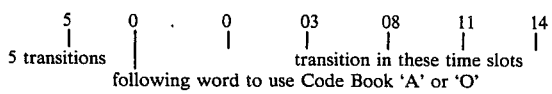

```
  5       0  .   0      03      08     11     14
  |       |      |      |       |      |      |
5 transitions    |             transition in these time slots
          following word to use Code Book 'A' or 'O'
```

In this particular case although it is from the 'same' the magnitude of the shift of direct component happens to be zero as can be calculated. If 'B' level 16 'opposite' had been selected the number would have been 50.004071114 with transitions in the 0,4,7,11 and 14th time slots and the shift would have been −2 i.e. a shift of 2 in the opposite direction to the polarity existing just before the zero time slot.

The number of address bits for the ROM will total 10, 8 for the data, one for differentiating between Code Books 'A' and 'B8' and one 'same' or 'opposite'. As mentioned earlier 1 output bit will suffice for time slots 0 and 1, taken as a pair, and 2 bits for each of the triads 2–4, 5–7, 8–10, 11–13 and 14–16 making 11 bits in all; to refer to time slot 16 is incorrect but it can be used to control the selection between Code Books 'A' or 'B' to be used for the next 8-bit word. A total of 11 output bits is required and since 8-bit wide ROMs are common there could remain 5 bits surplus when two are used.

These 5 bits could be used and are sufficient to aid the evaluation of a running sum and to provide the important information whether the number of transitions in a word is odd or even and the sign and magnitude of the change. None of these bits is essential since the information may be derived from the transition information but this information may make it easier to achieve fast operation and simplify running sum computation.

It may be useful to note that the code with six transitions at time slots 0,3,6,9,12 and 15 is not used; this might be useful for synchronisation. The continuation 2, 5, 8, 11 and 14 is used for level 5 Code Book 'A'. Another useful feature for synchronisation is that a transition in time slot 14 never preceeds any word in Code Book 'B'.

The constraints used in the Code Books are that no transitions are less than 3 or more than 12 time slots apart with the exception that between transitions in adjacent words the maximum separation may occasionally be 15 time slots; the latest first transition is in time slot 9 and the earliest last transition is in time slot 10 ignoring the cases where a further transition is forced to occur in time slots 0 or 1 in the following word.

FIG. 6 shows the above described arrangement in more detail. An 8-bit input latch feeds the information word to be carried as an address for a 10×16 programmed ROM 62. Outputs $D_o$-$D_{10}$ of the ROM 62 are fed to six assemblies of latches 63-68 and are operated thereby in accordance with the truth tables shown in FIG. 7.

The assemblies of latches 68-68 transform the eleven outputs $D_o$-$D_{10}$ from ROM 62 into sixteen signals, fifteen of which are fed through a further block of latches 70 clocked a word frequency and into a parallel to series converter 71. The output of the converter 71 os fed through a divide-by-two circuit 72 and an output latch 73 which is clocked at bit rate e.g. sixteen times word rate.

The sixteenth signal from the assemblies of latches is used to indicate whether Code Book 'A' or 'B' should be used; if the sixteenth signal is a 'O' Code Book 'A' is used for the next word while if the signal is a '1' Code Book 'B' is used. The sixteenth signal is fed through a latch 75 clocked at word frequency and the output of the latch 75 is fed as an input to latch assembly 63 and as an address bit to the ROM 62.

Outputs $D_{11}$-$D_{14}$ of the ROM 62 are assembled in an accumulator 76 and the sixteenth output $D_{15}$ is added to or subtracted from the signal in the accumulator 76 after being fed through a latch 77 and a divide-by-two-circuit 78. The output of the accumulator is used as the tenth addressing input to the ROM 62.

Figure 8:
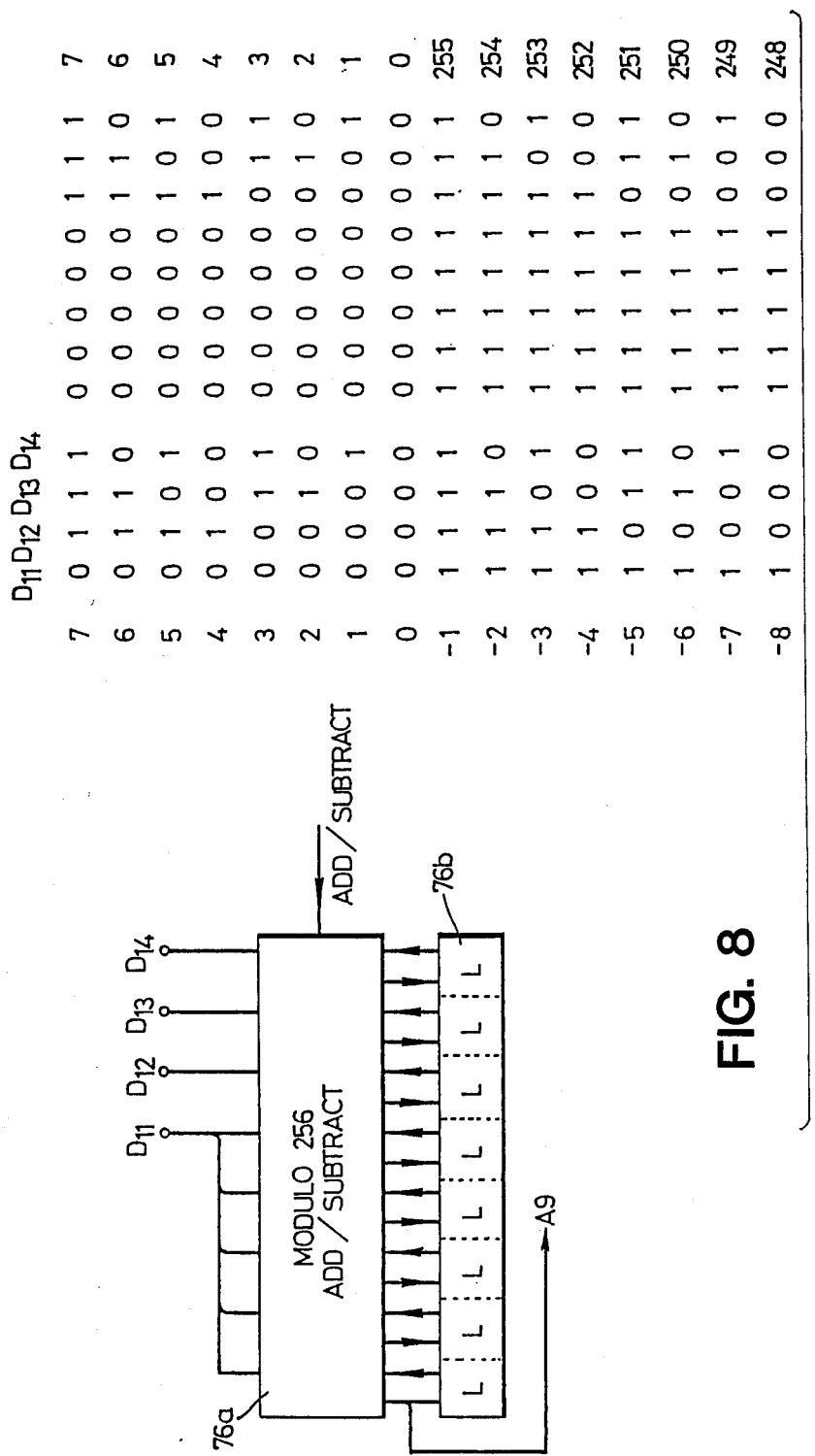
FIG. 8 shows in more detail one way in which a part of the encoder of FIG. 6 may be implemented and is accompanied by its truth table.

As shown in FIG. 8, the accumulator 76 may be constructed from a modulo 256 counter circuit 76a which feeds an 8-bit latch 76b. PROM 62 contains 1024 words of 16 bits and is addressed chiefly by the 8 bit words ($A_0$ to $A_7$) containing the information to be carried. However, there are two further address bits $A_8$ and $A_9$. It is convenient to consider that if $A_8$ is 'zero' then Code Book 'A' will be used whereas Code Book 'B' will be used if $A_8$ is in the 'one' state. For each of these code books some of the words output from the PROM will differ depending on the state $A_9$; the state of $A_9$ is controlled by the most significant bit of an accumulator which will be assumed to operate in module 256 Initially this should be set to represent a 128 state (127 would also be usable) but 128 will be assumed. If the state is in the range 128 to 255 inclusive then $A_9$ will be high and this selects 'opposite', if the state is in the range 0 to 127 inclusive 'same' will be selected.

All the inputs to the parallel to serial converter 71 are in the 'zero' state except for those where transitions are required; these are in a 'one' state. Whenever a 'one' state reaches the output of the parallel to serial converter 71 the divide-by-two circuit 72 changes state so causing the production of a transition.

Knowing the required transition patterns, the patterns of data $D_0$ to $D_{10}$ may be derived from consideration of the Truth Tables shown in FIG. 7. Note however that for 'A' words the state of $D_0$ is irrelevant and that $D_9$ and $D_{10}$ are both 'ones' when the following word is required to be from the 'B' Code Book.

For the embodiment shown there remain 5 bits $D_{11}$-$D_{15}$, of the 16 output bits, that are not used for the information being carried. These may be used for evaluating the running-sum rapidly. The running sum is usually defined for NRZ as follows. At the initial start of data the running-sum is assumed to be zero. As each succeeding bit occurs the running-sum is incremented by one if the bit represents a 'one' whilst it is decremented by one if the bit represents a 'zero'. For NRZ after an even number of bits the running-sum must be even. With this method of running-sum calculation the running-sum at the end of the word only becomes available after the start of the last bit of the word.

With the ⅔ coder a choice needs to be made for the next word to be coded dependent on the running-sum which will exist at the end of the current word. The variation of the running-sum during a word can never be greater than the range ±8; the extreme values would only occur if no transitions occurred within a word. It is assumed when the running-sum is computed that a state is counted as ±½ per half bit-cell. For an even number of half bit-cells the possible sum variations during a word always have integer values.

For code-books which are practical there will always be at least one transition in a word preventing the extremes of the range being used so a four bit number, capable of representing the number range −8 to +7, will always be sufficient. It is convenient to represent zero variation by the binary number 0000 and to add decimal 16 to negative numbers. The modulo 16 numbers can be changed to the appropriate modulo 256 numbers by applying the $D_{11}$ input to the adder also to the higher significance inputs as shown in FIG. 8.

It is suggested that the running-sum variation during a word should be the one starting from the centre of half-cell 'O' up to the same point on the following word and that it be assumed that the state prior to the start should be 'one'.

Since the polarity of the signal immediately before the start of half-cell 'O' will reverse each time a previous word has an odd number of transitions it is necessary to appropriately switch the accumulator from addition to subtraction. This is achieved by making $D_{15}$ a 'one' in all cases where the number of transitions in a word is odd. At the end of that word the divide by two changes state so switching the accumulator from add to substract or vice versa at the appropriate times.

There are many requirements of the replay circuitry which are unconnected with the channel code used and these will not be considered and it will be assumed that, a transition causes a '1' state lasting one time slot, that clocks at twice the bit cell frequency and that word framing are available.

The important step is how to reduce a pattern of transitions which may be occurring at 16 different points per word into say 10 or 11 binary digits used for addressing a ROM of practical size.

There are two approaches of interest. One is based on auxilliary ROMs. Only 28 different combinations of valid transition patterns may occur in eight adjacent time slots; this number can be portrayed by 5 bits. A small read only memory with 256 address locations would be used for this purpose and the speed could be so high that the same ROM could be used twice per word rather than to use two identical ROMs. This method can incorporate the checking of the minimum separation of transitions of three time slots. Table 2 shows the relationship between the number of, adjacent time slots, possible patterns and the number of bits; in practice some limitations such as the first transition occurring no later than time slot 8 (ninth time slot) may be used to slightly decrease the number of possible patterns if this is high. It is desirable that at least one additional pattern be available so that faulty operation can be signalled when two transitions are apparently separated by less than three time slots.

TABLE 2

| No. of time slots | 3 | 4 | 5 | 6 | 7 | 8 | 9 | 10 | 11 | 12 |
|---|---|---|---|---|---|---|---|---|---|---|
| No. of patterns | 4 | 6 | 9 | 13 | 19 | 28 | 41 | 60 | 88 | 129 |
| No. of bits | 2 | 3 | 4 | 4 | 5 | 5 | 6 | 6 | 7 | 7? |

Figure 9:
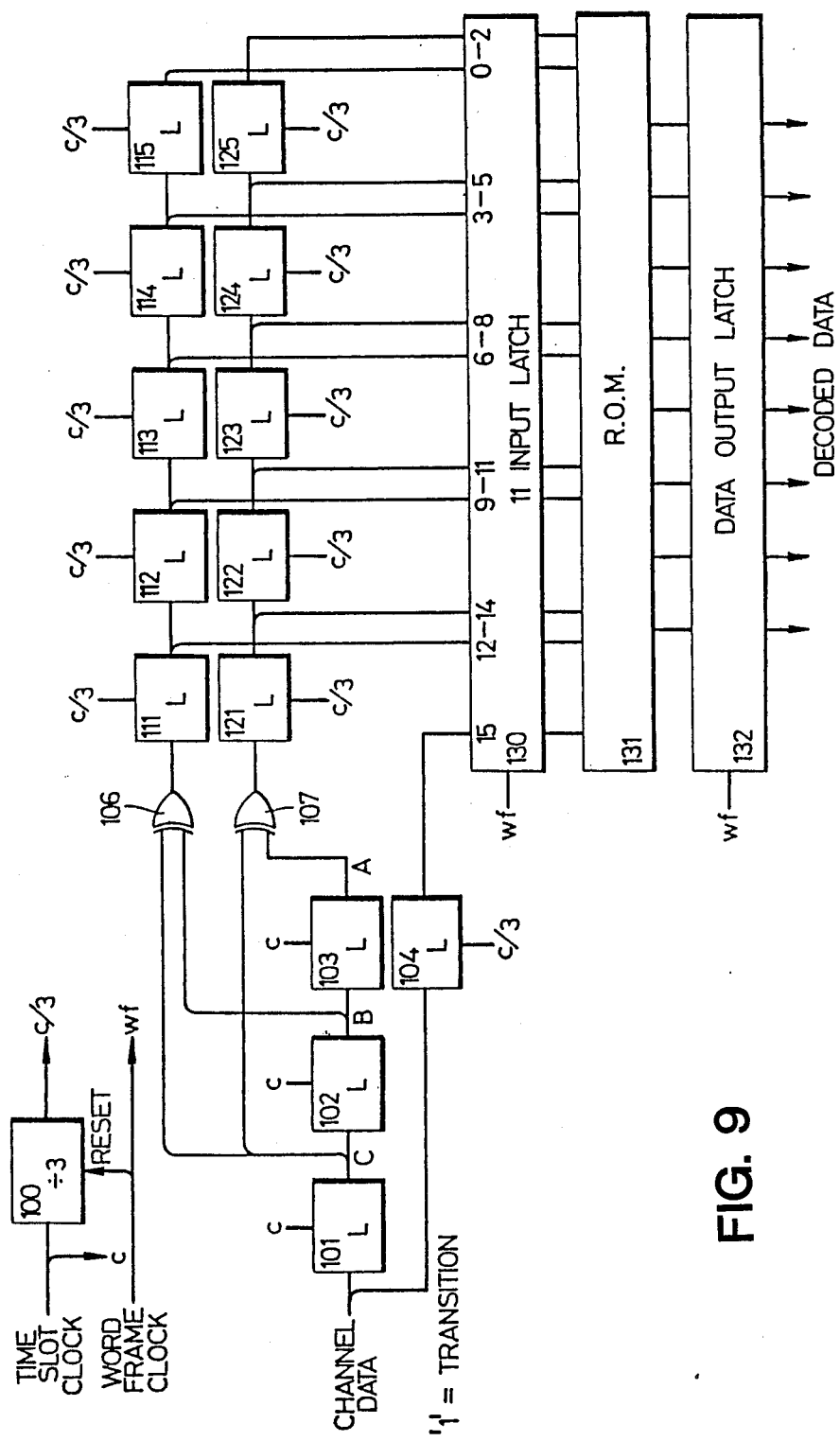
FIG. 9 shows in block diagram form a decoder for decoding the signal encoded by the encoder of FIG. 6.

The alternative method which uses no auxilliary ROM is shown in FIG. 9.

Before describing FIG. 9 in detail it is necessary to recall that there is a time slot clock running at double the frequency of the word frame clock and also that in the code words there must be at least three time slots between adjacent transitions. This latter feature requires that a further clock signal be generated where frequency is ⅓ the time slot clock frequency.

Turning now to FIG. 9, incoming serialized code words are fed through a seris of latches 101, 102, 103 clocked at time slot frequency which together with EXCLUSIVE OR gates 106 and 107 form a data validation section. The output from gate 106 is fed through a series of latches 111-115 clock at ⅓ the time slot frequency while the output from the gate 107 is fed through another series of latches 121-125 also clocked at ⅓ the time slot frequency. The outputs from the latches 111-115 and 121-125 constitute ten inputs to an 11-input latch 130 which is clocked at word frame frequency. The eleventh input to the latch 130 is derived from a further latch 104 which is with the incoming serialized code words. Every three time slots the latches 111 and 121 capture the information derived from outputs A, B and C of the latches 101, 102, 103 and have the states 01, 10 and 11 for transitions at A, B and C respectively. If A, B and C all have no transition present these latches have the state 00. After a word, the information derived from 15 of the 16 time slots, time slots 0-14, appears at the output of latches 111-115 and 121-125 in coded form. The information for time slot 15 is captured by the latch 104. It will also have previously captured the presence of transitions at time slots 3, 6, 9 and 12 but these are ignored. The eleven input latch 130 operates once per word and transfers the data then present at its inputs to the address inputs of a ROM 131 which contains the data necessary to convert the coded data into the original digital words, i.e. the information relating to both code books 'A' and 'B'. At the same time the 8 data outputs from the ROM for the previous word are captured by the output latch 132. For this system it is necessary to check for invalid data where transitions occur at less than three time slots separation. If, during a word, A and C or B and C are simultaneously both '1s' the word is invalid. This may either be used as a 'flag' on the word but a possible alternative or addition would be to clear the input latch to the ROM when the word is entering and to reserve one output state, for example all 'ones', which may need to be excluded from the normal signal range.

I claim:

1. A method of processing digital information prior to recording, comprising the steps of:

inputting a succession of digital words each comprising a plurality of bit locations;

generating a respective code word for each digital word, with each word having the same period as the input digital word but a number of time slots which is twice the number of bit locations in an input digital word, each code word having a minimum spacing of a period equal to the period of three time slots between adjacent transitions;

providing a running sum whose value depends on the number and spacing of transitions in successively generated code words; and providing four groups of code words from which each successive code word is generated, the four groups comprising first and second group pairs, the code word generated for a particular digital word being generated from the particular group in a group pair as a function of the polarity of the running sum;

defining a predetermined adjacent pair of time slots, being the same time slots for each code word, code words in the first group pair having no transitions in the predetermined time slots, and code words in the second group pair having a transition in one or other of the predetermined time slots;

the code word generated for a particular digital word being generated from the first or second group pair in dependence on the immediately preceding code word, and if the code word is to be generated from the second group pair, the position of the transition within the predetermined pair of time slots is dependent on the particular digital word that is being coded.

2. A method in accordance with claim 1, wherein for some, but not all of the digital words, respective code words in each group of a group pair are identical.

3. A method in accordance with claim 1, wherein the code words included in each group of a group pair are initially allocated to the particular group from a consideration of the running sum variation which their selection for processing would cause.

4. A method in accordance with claim 1, wherein the running sum is updated for each successive code word at the same time as the code word is being selected, by monitoring the characteristics of the code word as it is being selected.

5. Apparatus for processing digital information prior to recording, comprising:
- a memory device containing information relating to four groups of code words, the groups comprising first and second group pairs;
- means for addressing the memory device with an input digital word to output information relating to a desired code word for the input digital word from one of the four groups, each code word having the same period as the period of the input digital word but a number of time slots which is twice the number of bits than in the digital word, each code word having a minimum spacing of a period equal to the period of three time slots between adjacent transitions;
- means for monitoring the code word and for addressing the memory device for a succeeding code word, and comprising means for computing a running sum whose value depends on the number and spacing of transitions in successively generated code words, such that the succeeding code word is chosen on the basis of the preceding code word, the state of the running sum, and the input digital word;
- a predetermined adjacent pair of time slots being defined for each code word, being the same time slots for each code word, code words in the first group pair having no transitions in the predetermined time slots, and code words in the second group pair having a transition in one or the other of the predetermined time slots; and
- the means for addressing the memory device for a succeeding code word being arranged such that the code word generated for a particular digital word is generated from the first or second group pair in dependence on the immediately preceding code word, and if the code word is to be generated from the second group pair, the position of the transition within the predetermined pair of time slots is dependent on the particular digital word that is being coded.

6. Apparatus according to claim 5, wherein the information generated by the memory means is input to a code converter to generate a code word.

7. Apparatus according to claim 6, wherein a series of groups of latches are connected to outputs of the meory device to generate the code words.

8. Apparatus according to claim 5, wherein the means for monitoring causes production of digital information indicative of whether there are an odd or even number of transitions in the code word being generated and indicative of the change in magnitude of the running sum, and the digital information is produced by the monitoring means at the same time as the code word is being generated.

* * * * *